United States Patent [19]

Yang

[11] Patent Number: 4,986,644
[45] Date of Patent: Jan. 22, 1991

[54] WEARABLE BINOCULARS

[76] Inventor: John J. Yang, 2416 W. 231 St., Torrance, Calif. 90501

[21] Appl. No.: 405,305

[22] Filed: Sep. 11, 1989

[51] Int. Cl.⁵ .............................................. G02B 23/18
[52] U.S. Cl. ................................... 350/548; 350/549; 350/555
[58] Field of Search .............................. 350/545–549, 350/555, 550

[56] References Cited

U.S. PATENT DOCUMENTS

| | | | |
|---|---|---|---|
| 2,024,322 | 12/1935 | Wittig | 350/549 |
| 2,625,855 | 1/1953 | Gaylor | 350/549 |
| 3,266,367 | 8/1966 | Dowling et al. | 350/555 |
| 3,414,347 | 12/1968 | Stoltze | 350/547 |
| 4,013,341 | 3/1977 | Riley | 350/546 |
| 4,284,325 | 8/1981 | Ishibai et al. | 350/555 |

FOREIGN PATENT DOCUMENTS

| | | | |
|---|---|---|---|
| 30264 | 3/1926 | France | 350/550 |
| 160935 | 3/1921 | United Kingdom | 350/550 |

*Primary Examiner*—Jon W. Henry
*Attorney, Agent, or Firm*—Fleit, Jacobson, Cohn, Price, Holman & Stern

[57] ABSTRACT

A pair of wearable binoculars with dual functions of adjusting focus and eye relief, capable of adjusting the focus for a single eye separately, and suitable for leisure purposes such as watching plays or games.

1 Claim, 3 Drawing Sheets

WEARABLE BINOCULARS

BACKGROUND OF THE INVENTION

This invention relates to binoculars which can be worn on a user's head without the need for holding the binoculars by hand and which have independently adjustable eyepiece devices to facilitate adjusting the focus and eye relief and separately adjusting the focus for a single eye.

The focus adjustment of conventional binoculars is often done by taking the use of screw-thread transmission to control the distance between the eyepiece and objective lens. So far as the manufacturing technique is concerned, the screw-thread dies-making technique is difficult, so that the manufacturing cost of the dies is higher than that of dies in general. In order to make a reasonable profit, such cost has to be reflected in the price to the consumer resulting in increased prices he must pay. For a pair of binoculars for leisure which do not need maximum precision, such a cost is economically important.

In addition, generally speaking, among an absolute majority of people, the sight of two eyes of anyone differs from each other, but the focus adjustment of conventional binoculars is performed synchronously for one's two eyes but cannot be done separately for either the left or right eye. Therefore, for someone who has a large sight difference between his or her two eyes, conventional binoculars cannot meet the user's requirements.

SUMMARY OF THE INVENTION

The primary object of the present invention is to provide a pair of wearable binoculars having the dual function of adjusting the focus and eye relief and separately adjusting the focus for a single eye.

A further object of the present invention is to provide a pair of portable binoculars in a wearing device so that they can be worn on the user's head without the need of holding it manually.

The present invention meets these objectives by providing a pair of novel and practical binoculars which are characterized making use of an H-shaped housing to contain an adjusting device wherein two control boxes contain two eyepiece boxes, whereby all these members therein can be correspondingly displaced forward and backward as well as left and right toward each other, the focus for either left or right eye can be adjusted separately, and the eye relief can be adjusted freely.

BRIEF DESCRIPTION OF THE DRAWINGS

The invention will now be described in detail with reference to the accompanying drawings wherein.

DETAILED DESCRIPTION

Figure 1:
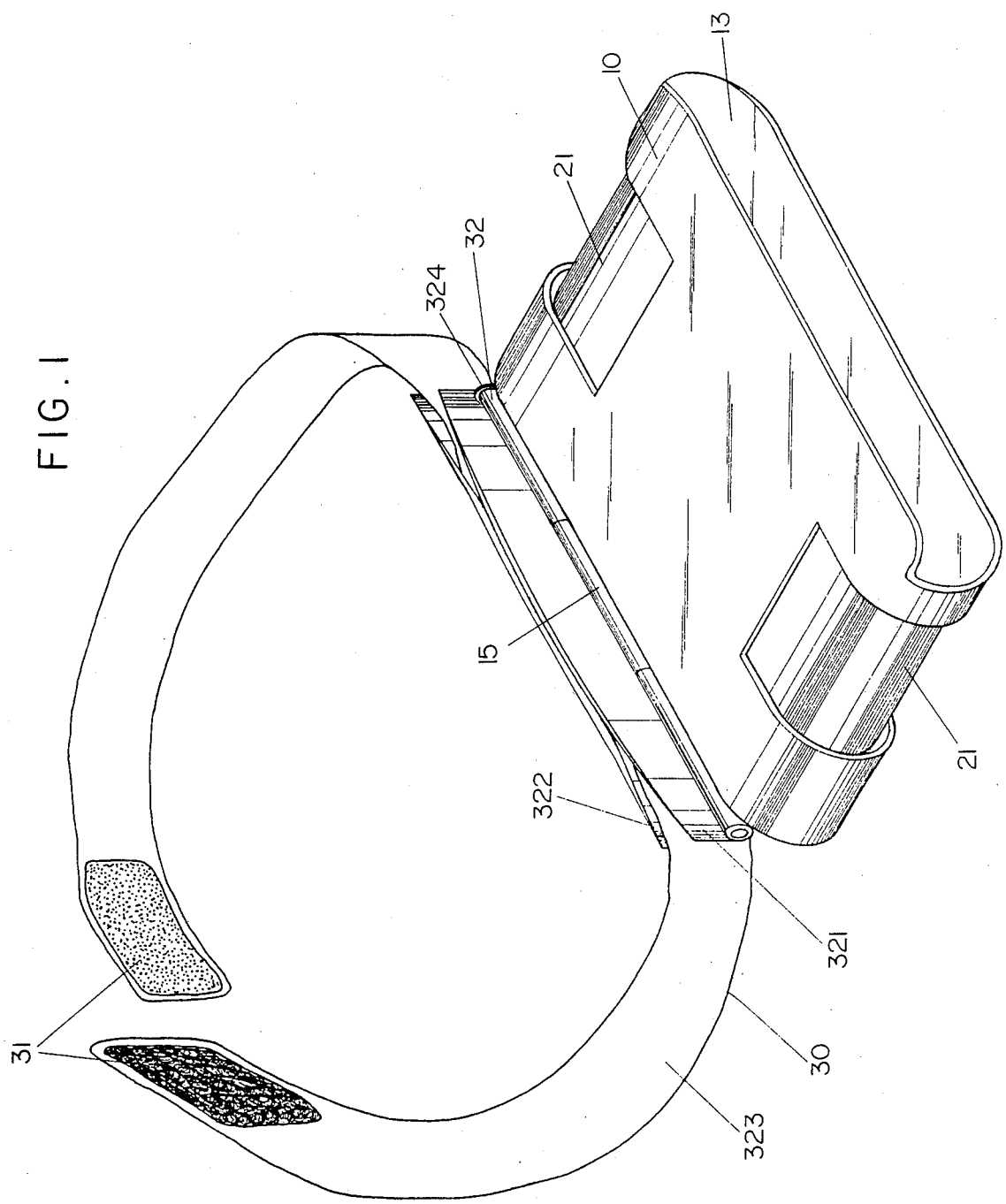
FIG. 1 is a perspective view of one embodiment of the present invention.
Figure 2:
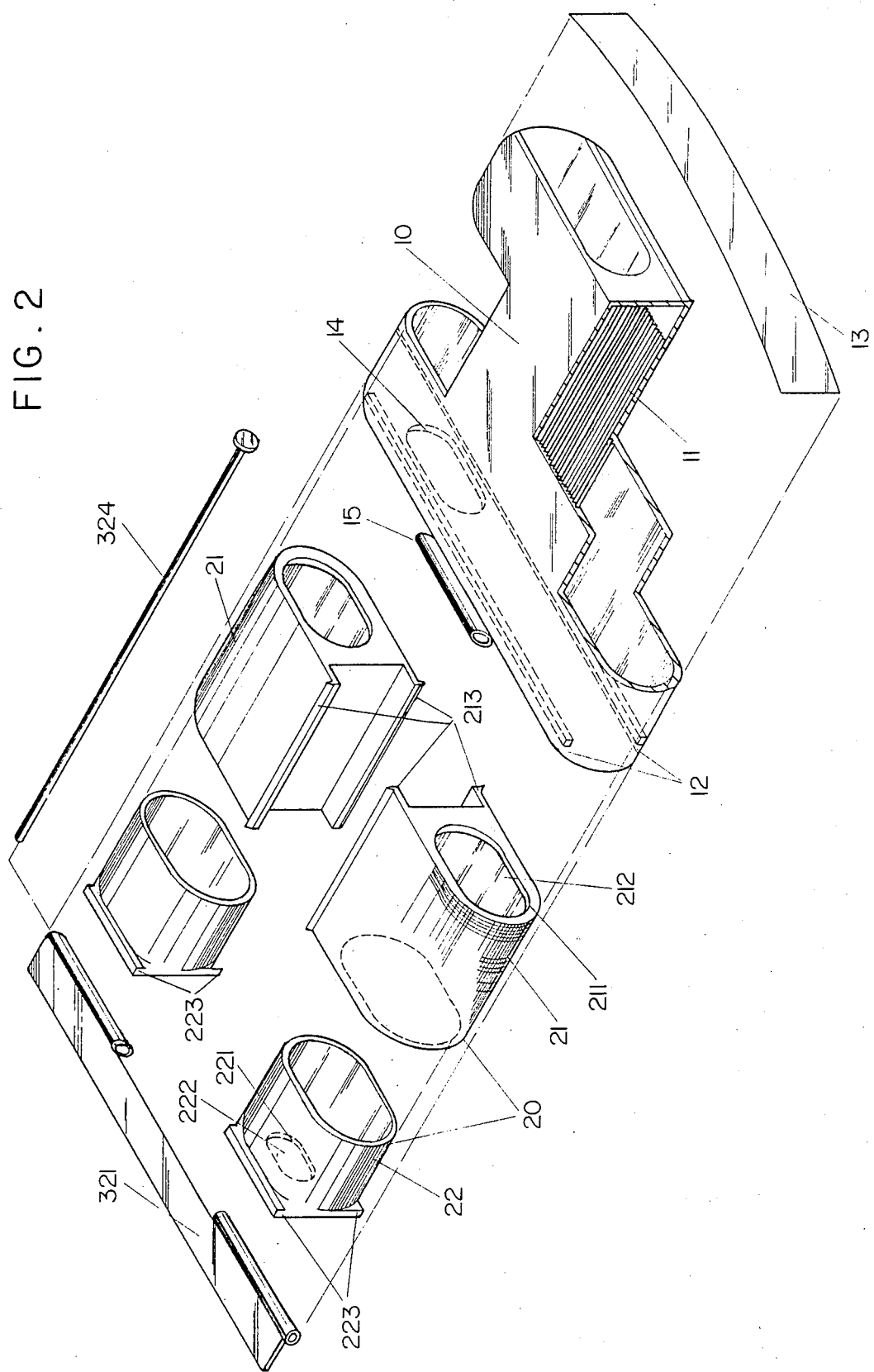
FIG. 2 is an exploded perspective and cut-away view showing parts of the invention of FIG. 1.
Figure 3C:
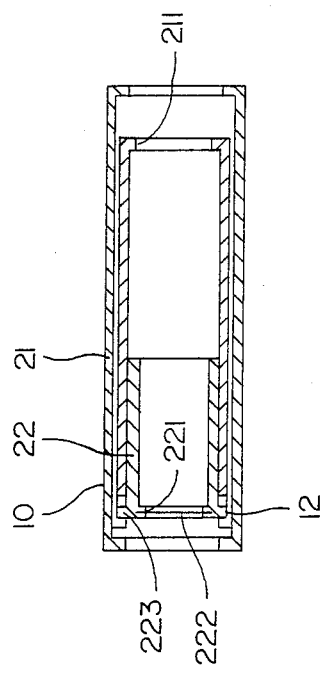
FIG. 3c is a longitudinal cross-sectional view of the invention of FIG. 1 showing the control boxes in a longitudinal inner position; and, FIG. 3d is a view similar to FIG. 3c showing the control boxes in a longitudinal outer position.
Figure 3D:
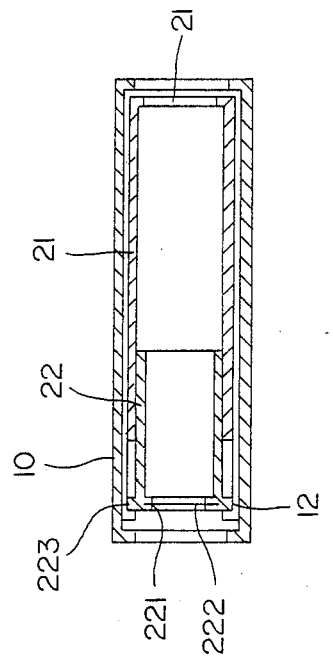
FIG. 3a is a lateral cross-sectional view through the invention as shown in FIG. 1 with the control boxes in a lateral outer position.
FIG. 3b is a view similar to FIG. 3a showing the control boxes in a lateral inner position.
Figure 3A:
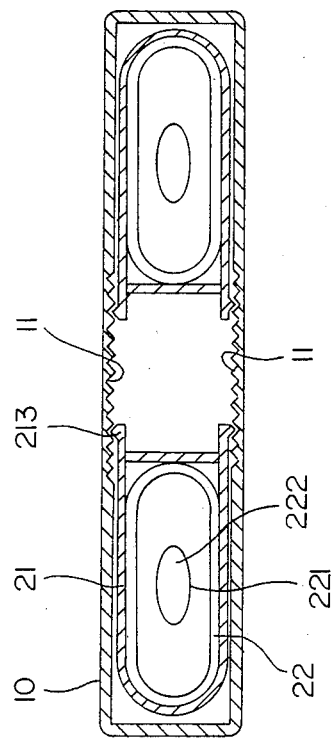
Figure 3B:
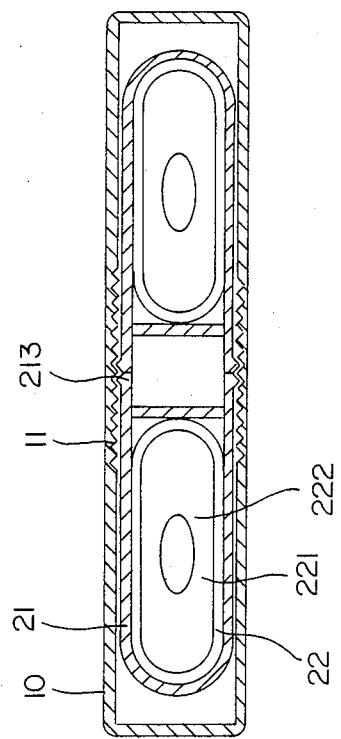

As shown in FIGS. 1 and 2, the present invention consists of a housing 10, an adjusting device 20 and a wearing device 30, wherein the appearance of housing 10 is similar to an English letter H. A plurality of sliding grooves 11 is longitudinally arranged in a relative parallel arrangement in the housing for adjustment forward and backward and adjustment of the distance between the two control boxes on the wall in central area of the housing 10. The rear edge of the inner wall of housing 10 is provided with eyepiece grooves 12 corresponding to each other and extending upwardly and downwardly. The front of housing 10 is provided with a color film 13. The adjusting device 20 consists of two control boxes 21 and two eyepiece boxes 22 telescopically engaging control boxes 21. Objective lens frames 211 are at the front of the control boxes 21 and contain objective lenses 212, and the inner side of each control box 21 is provided with upper and lower flanges 213 which engage in longitudinal sliding relationship with the sliding grooves 11 on the inner wall of housing 10 for adjustment of the focus between each eyepiece 222 of each eyepiece box 22 and the objective lens 212 of control box 21, as well as lateral displacement in the sliding grooves 11 for adjusting the eye relief between the left and right control boxes 21. The rear edge of each eyepiece box 22 is provided with tenons, or flanges, 223 corresponding to each other and protruding up and down for coupling with the eyepiece grooves 12 on the rear edge of the inner wall of housing 10 so that the eyepiece box 22 can move only laterally on the inner wall of housing 10. The rear part of each control box 21 contains in sliding engagement an eyepiece box 22 of which the rear part contains an eyepiece frame 221 wherein an eyepiece 222 is provided.

The head connecting device 30 consists of a belt 323 attached with an adhesive retainer 31 and a hinge type coupling element having a hard plastic plate 321 provided at the front with coupling tubes 32 connected with the tubular thimble 15 on the rear upper edge of housing 10 by a hinge pin 324 so that the coupled housing 10 can be turned upwardly optionally to an angle of 90°. An arched soft rubber strip 322 is provided on the rear of coupling 32, and belt 323 is fixed between the plastic plate 321 of coupling 32 and the soft rubber strip 322.

For adjusting the focus of the present invention, the control boxes 21 of adjusting device 20 can be respectively adjusted to the best focus for the user's eyes by sliding the upper and lower flanges 213 individually longitudinally in the sliding grooves 11. When adjusting the eye relief, the control box flanges 213 of adjusting device 20 are laterally moved in the sliding grooves 11 whereby eyepiece boxes 22 move along the eyepiece grooves 12.

Since the projection of sliding grooves 11 is minimum, only a light force is required to be applied to push or pull the control box 21 laterally so that upper and lower flanges 213 slide over the ridges between the grooves 11.

The belt 323 of wear device 30 can be easily fitted on the user's head through the retaining force of adhesive retainer 31, and the soft rubber strip 322 in the coupling 32 under the pressure or belt 323 can be tightly attached to the user's forehead in line with the curvature of the forehead, so the user will never feel uncomfortable.

I claim:

1. A pair of wearable binoculars comprising:
   a housing having a shape substantially in the form of an H having a hollow interior, an inner surface and an outer surface, and an outer and an inner end;
   a plurality of longitudinally extending parallel grooves on upper and lower inner surfaces of the housing, the grooves on the upper surface corresponding with those on the lower surface and extending in the direction of the inner and outer ends;
   a pair of control boxes within the hollow interior of the housing in opposed spaced relationship, said control boxes being hollow and having front and rear ends and inner and out side portions;
   upper and lower flanges extending from said inner side portion of each control box and slidingly engaging in said upper and lower parallel grooves, respectively, for longitudinal sliding movement and for adjustment at right angles to the longitudinal direction of said grooves;
   a color film on said outer end of said housing;
   an objective lens frame at the front end of each control box;
   an objective lens in each objective lens frame;
   upper and lower eyepiece grooves in the inner surface at the inner end of said housing extending in a lateral direction transverse to the longitudinal direction of said parallel grooves;
   a pair of eyepiece boxes telescopically engaging through said inner ends of said pair of control boxes, said eyepiece boxes being hollow and having inner and outer ends, said outer ends being disposed in the hollow interior of said control boxes;
   upwardly and downwardly extending flanges on the rear end of each eyepiece box slidingly engaging in said upper and lower eyepiece grooves at the inner end of said housing;
   an eyepiece frame in the inner end of each eyepiece box;
   an eyepiece in said eyepiece frame of each eyepiece box;
   a tubular coupling member on the rear end of said housing extending upwardly from the outer surface thereof;
   a hard plastic plate having tubular coupling members attached thereto;
   a hinge pin insertable into said coupling members on said housing and said plastic plate for pivotally coupling said plastic plate to said housing;
   an arched soft rubber strip attached to said plastic plate for engagement against a user's forehead; and,
   a belt member attached between said plastic plate and said soft rubber strip and having outer ends each having an adjustable adhesive retainer thereon for adjustment to the user's head;
   so that said control boxes are manually adjustable laterally by sliding between adjacent longitudinal grooves for adjusting said eyepiece boxes laterally, and manually adjustable longitudinally to adjust the focus of the objective lens with respect to the eyepiece, and the housing is pivotable upwardly substantially 90° with respect to the plastic plate when mounted on a user's head.

* * * * *